United States Patent [19]

Stashko

[11] Patent Number: 4,632,593
[45] Date of Patent: Dec. 30, 1986

[54] PIN LOCK INSERT HOLDER

[75] Inventor: Daniel R. Stashko, Holly, Mich.

[73] Assignee: GTE Valeron Corporation, Troy, Mich.

[21] Appl. No.: 722,068

[22] Filed: Apr. 11, 1985

Related U.S. Application Data

[63] Continuation-in-part of Ser. No. 705,189, Feb. 25, 1985, abandoned.

[51] Int. Cl.[4] .............................................. B23B 27/16
[52] U.S. Cl. ..................................... 403/316; 403/11; 403/24; 407/104; 407/105
[58] Field of Search .................. 407/104, 105; 403/11, 403/315, 316, 24

[56] References Cited

U.S. PATENT DOCUMENTS 3,491,421  1/1970  Holloway ........................... 407/105
4,245,937  1/1981  Erickson .......................... 403/374 X
4,507,023  3/1985  Shikata ............................. 407/105 X

FOREIGN PATENT DOCUMENTS 2041797  9/1980  United Kingdom ............... 407/105

Primary Examiner—Cornelius J. Husar
Assistant Examiner—Joseph A. Fischetti
Attorney, Agent, or Firm—Lloyd M. Forster

[57] ABSTRACT

Pin lock insert holder constructed as an essentially straight lever having longitudinally spaced hold down and fulcrum projections on opposite sides and a lever actuating recess engaged by an angularly related screw. An additional shim retention projection and snap ring accommodate loosening for insert replacement with secure retention of pin and shim against removal or dislocation. Modifications without shim retention accommodate small inserts with shorter lock pins.

20 Claims, 11 Drawing Figures

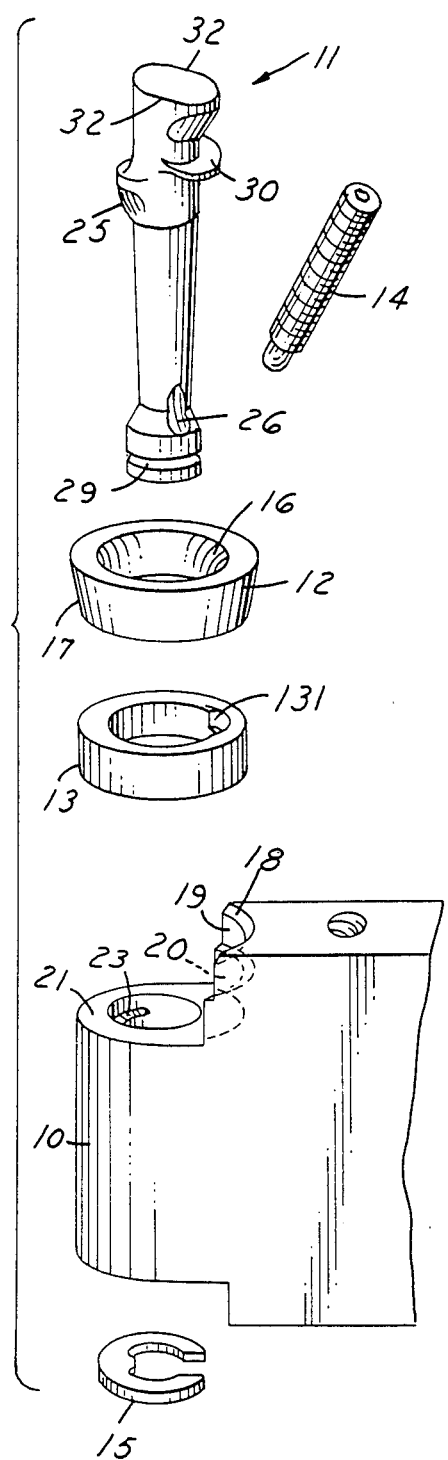

PIN LOCK INSERT HOLDER

RELATED APPLICATION

This is a continuation-in-part of application Ser. No. 705,189 filed Feb. 25, 1985 now abandoned.

BACKGROUND OF THE INVENTION

There are numerous forms of prior art lock pins adapted to retain an insert having a central aperture on a holder including a shoulder and replaceable shim seat for the bottom of the insert. In one common version, a conical taper screw head engages the curved opening of an "ISO" aperture in the insert providing a straight axial threaded retention screw normal to the bottom seat. Under certain conditions, the screw may unwind due to the cutting force direction; on other occasions the forces tend to rotate the insert and tighten the screw to the extent that it shears off.

In another design, a similar uniformly headed unthreaded lock pin having a sliding fit in an unthreaded bore in the holder is notched for engagement by an angular set screw forcing the pin down. In this case the lock pin must be completely removed to replace the insert with no means for preventing the pin and shim from falling out when the set screw is backed off.

In a third case, a holddown screw with uniform tapered head is threaded into the holder at a angle with the thread and head size small enough to permit insert removal upon loosening. Each screw has strength limitations in providing a small enough size to accommodate loose pin insert removal. It is again possible in the case of a round insert for cutting forces on the insert to unwind or overtighten the screw.

In another design, a right angle "skiboot" pin configuration is provided with an offset insert engaging projection accommodating insert removal upon loosening with a fulcrum in the holder for the heel of the pin and a threaded screw adapted to apply leverage pressure on the "toe" of the pin. A shim retention bushing is provided which may get lost when the insert is removed. This is an expensive design but is otherwise satisfactory in providing desirable retention features.

Another variation feature an angularly bent pin with uniform conical head having fulcrum shoulder at the bend and screw engagement at the end to tilt the pin head into retaining engagement with the insert. This construction requires pin removal to replace the insert and has no shim retaining feature.

There are three pin retention designs commercially sold under the trademark "Tizit Maxilock K, P and S". They all involve uniform threaded straight retention pins with shaped heads and fulcrum shoulders either engaging special bushings or involving extra holddown clamps. These constructions are relatively expensive and may loosen or overtighten under cutting forces when applied to round inserts.

On the whole this is a crowded art with many additional variations such as disclosed in the following prior art reference patents; U.S. Pat. Nos. 3,314,126 (Stier); 3,316,616 (Milewski); 3,341,921 (Weller et al); 3,355,786 (Hargreaves); 3,490,117 (Hertel); 3,662,444 (Erkfritz); 3,848,303 (Faber); 3,908,255 (Faber); 4,044,440 (Stier) and 4,430,031 (Hellstrom).

BRIEF SUMMARY OF THE PRESENT INVENTION

The present invention involves a lock pin construction having irregular longitudinally spaced opposed projections which may be forged, cold formed or otherwise specially contoured to provide a combination of desirable features directed to optimize positive retention locking of conventional indexable inserts such as round, square, triangular, rhomboid, hexagon, pentagon, or the like having a central aperture and including positive rake side walls requiring downward as well as lateral retention forces.

Such features include non-rotation; positive orientation of the lock pin; head projection on one side only for insert engagement accommodating insert removal upon loosening together with maximum pin stock for strength; shoulder projection for engagement with a contoured angular fulcrum seat in the holder aperture wall to provide desired reaction for pin tilting with combined downward and lateral direction of insert retaining force; shim retention projection engageable with shim retention groove on the shoulder side of the holder, leaving full area shim support under the insert where major cutting forces are incurred; a locking screw engageable recess adapted to center the leverage force applied to a somewhat elongated pin projecting to the bottom of a through aperture in the holder; and a snap ring groove at the end of the lock pin to prevent lock pin disengagement from the holder upon loosening for insert replacement.

In a further modified construction, particularly adapted for positive small round inserts, the shim and shim retention provision in the lock pin have been omitted, and the configuration of the lock pin altered to provide an extended oblong cross section, with matching oblong hole in the holder, thereby providing a strong pin in a strong tool holder.

A still further modification includes a shortened pin wherein the fulcrum extends below rather than above the actuating screw contact surface so that a relatively shallow nose of the tool may be employed.

BRIEF DESCRIPTION OF THE DRAWINGS

FIG. 4 is a perspective exploded view of the respective elements shown in the holder of FIG. 1;

FIG. 5 is a fragmentary sectional view of another modified pin lock insert holder constructed in accordance with the present invention without provision of a shim;

FIG. 6 is a fragmentary plan view of the holder per se omitting the insert pin and screw illustrated in FIG. 5;

FIGS. 7, 8, 9 and 10 are progress fragmentary sectional views of the lock pin taken along sectional lines 7—7, 8—8, 9—9, and 10—10 of FIG. 5;

DETAILED DESCRIPTION OF THE DRAWINGS

Figure 1:
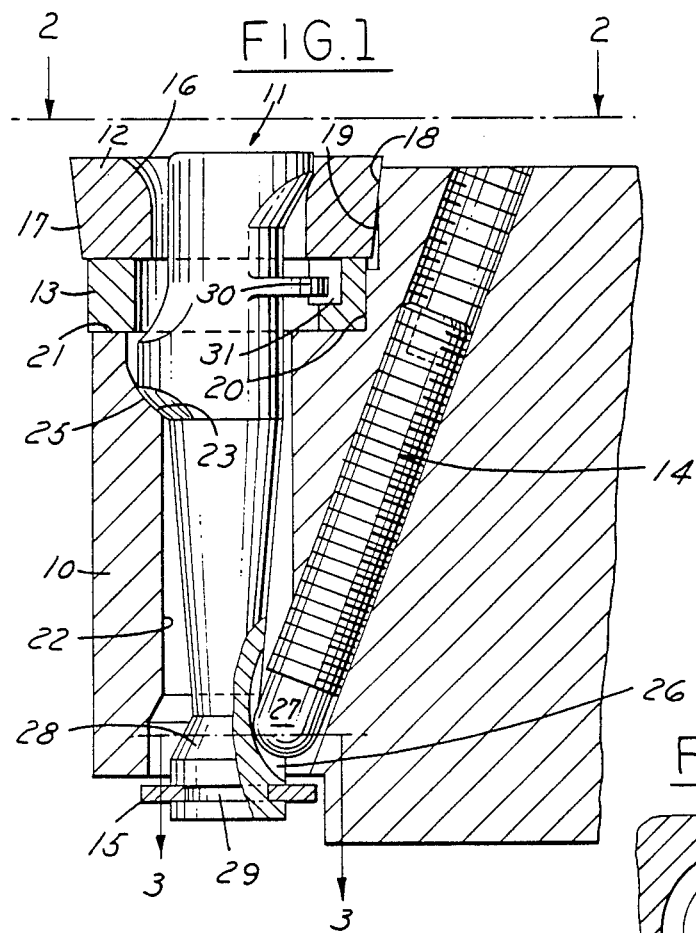
FIG. 1 is a fragmentary sectional view of a pin lock insert holder constructed in accordance with the present invention.
Figure 3:
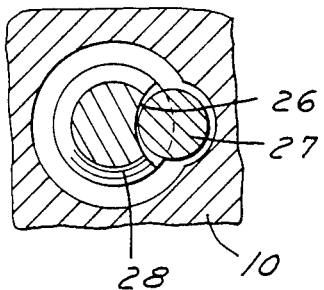
FIG. 3 is a sectional view taken along the line 3—3 of FIG. 1.
Figure 2:
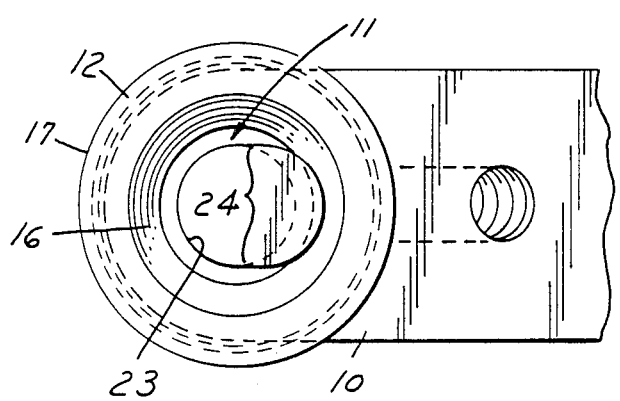
FIG. 2 is a plan view taken along the line 2—2 of FIG. 1.

With reference to FIG. 1 the elements of the present pin lock insert holder include holder body 10, lock pin 11, insert 12, shim 13, lock screw 14 and snap ring 15.

Insert 12, round in the present embodiment, is provided with conventional curved wall International Standards Organization "ISO" aperture 16 suitable for variable angle, e.g. 40°-60°, retention contact, positive rake side wall 17 engageable with tapered holder wall 18 extending above its cylindrical bore 19, cylindrical shim wall 20 and shim seat 21.

Through cylindrical bore 22 in the holder has offset fulcrum seat 23, preferably formed with semi-spherical nose of an end mill having a diameter equal to the bore 22 fed laterally from a coaxial position with bore 22 to form flats 24 as well as spherical radius fulcrum pocket 23 to engage matching projection 25 for reaction support against downward as well as lateral movement of lock pin 11 upon tightening of set screw 14 against curved recess 26 formed in the lower end of lock pin 11 by rounded end 27 of set screw 14. Curved recess 26 serves to center the pin lever actuating force and prevent "sliding off" which might otherwise result from the elongated unsupported extension of lock pin 11. Enlarged lower end 28 of pin 11 accommodates formation of an adequate curved actuation recess 26 as well as groove 29 for a standard "E" snap ring 15 serving to retain pin 11 from falling out upon loosening for replacement of insert 12.

While pin 11 is free to tilt in the direction corresponding to the plane of drawing FIG. 1, as required to hold insert 12 laterally against holder shoulder 18 and down against shim 13, flats 32 closely matching flats 24 in the holder aperture orient pin 11 in its plane of actuation and against rotation from any cutting force on insert 12, even if creeping rotation of the insert should occur during cutting action.

With reference to the embodiment of FIG. 5, lock pin 33 is similar in construction and operation to the lock pin 11 of FIG. 1 with certain exceptions. Elongated oblong section 34 engages matching oblong hole 35 in the holder which includes extension 36 terminating in ledge 37 engaged by pin shoulder 38. The pin configuration provides sufficient stability to permit screw 39 actuation on a simple flat surface 40, and omission of shim and shim retention projection 30 of the FIG. 1 embodiment permits a shorter, more compact and relatively rigid pin construction.

Figure 11:
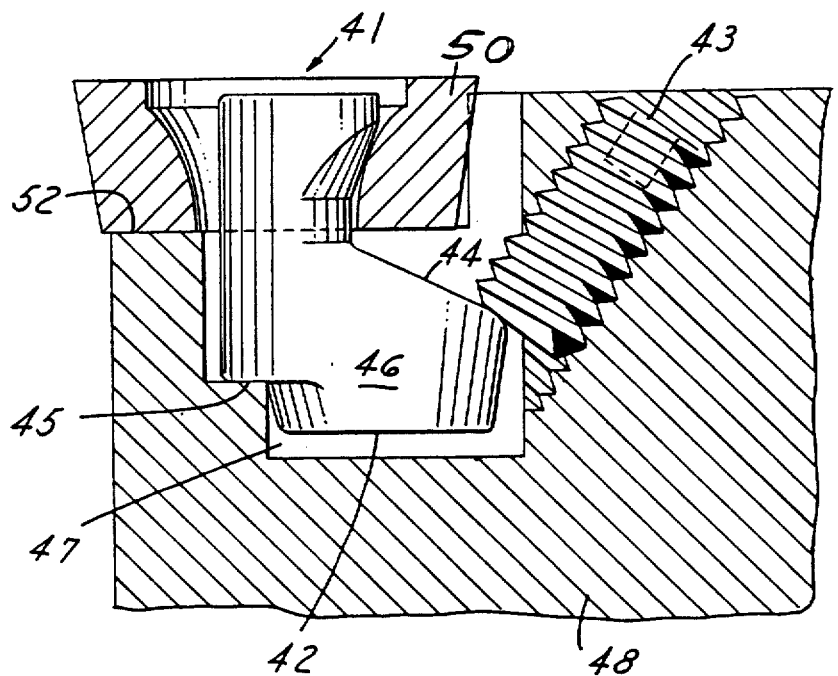
FIG. 11 is a fragmentary sectional view of a still further modified pin lock insert holder constructed in accordance with the present invention.

With reference to FIG. 11, a still more compact stub form of lock pin 41, having the same configuration as the FIG. 5 embodiment with the lower pin projection cut off at surface 42, is made possible by screw 43 actuation of pin surface 44 above the level of shoulder 45, the elongated oblong body 46 of pin 41 providing adequate leverage and line of actuation to secure round insert 50 as in the FIG. 1 and FIG. 5 embodiments. The FIG. 11 embodiment will also be seen to accommodate blind hole 47 contributing to rigid construction for tool holder 48 is compared with tool holder 49 where the oblong hole 35 projects through the holder.

In the FIG. 5 and FIG. 11 embodiments, round insert 50 directly engage seats 51 and 52 formed in holders per se 49 and 48 as most suitable for small inserts, e.g. of ¼" dia. Presently the only commercial holders for ¼ dia. inserts provide a simple flat head screw as a means to secure the insert. The small screws, which in turn have small sockets, do not allow for substantial torque and are difficult to remove after usage in machining and exposure to heat, chips and debris. Such screws must be completely removed in order to replace worn inserts. Should cutting forces tend to revolve the insert, the screw also tends to rotate; if counterclockwise it may loosen causing insert fracture; when clockwise overtightening occurs which may fracture the screw or make it almost impossible to remove. The present invention overcomes all of these detriments.

From the foregoing description it will be understood that while the form of locking pin 11 is irregular, involving special uni-directional projections and actuating recess pocket, the construction is otherwise relatively simple and as a whole economical of production with many advantageous features: In summary, optimum lateral and downward application of insert retention force; high leverage mechanical advantage and pin strength; single plane non-rotating tilting action; insert replacement upon simple loosening without pin removal or possibility of pin or shim falling out of the holder or becoming disoriented; optimum line of force for insert retention, fulcrum reaction, and pin lever actuation achieved with straight pin and straight through bore in the holder; adaptability to any polygonal indexable insert configuration; and complete versatility for effective insert retention, including positive rake inserts, without the necessity for auxiliary top clamping action.

What is claimed is:

1. Pin lock insert holder comprising, tool holder body having insert shoulder and seat, apertured insert engaging said shoulder, pin aperture means in said body extending substantially normal to said seat including offset fulcrum means, lock pin means having longitudinally spaced opposed projection means for engaging respectively said fulcrum means and said apertured insert, means acting on its end for tilting said lock pin means in a plane extending through said opposed projection means to hold said insert against said shoulder, and inter-engaging flat surface means between said respective lock pin and pin aperture means extending parallel to the plane of tilting and preventing relative rotation.

2. Holder of claim 1 including recess and set screw means for tilting.

3. Holder of claim 2 wherein complementary curved recess and set screw end surfaces are provided.

4. Holder of claim 1 wherein inter-engagement of said respective fulcrum and pin projection means provides resultant reaction force angularly related to said lock pin means so as to resist both its longitudinal and lateral displacement, and through lever actuation to exert a retaining force on said insert having both longitudinal and lateral components relative to said seat and shoulder.

5. Holder of claim 4 including inter-engaging positive rake insert side and engaged shoulder surfaces.

6. Holder of claim 5 including ISO aperture curved surface in said insert engaged by said pin projection means.

7. Holder of claim 1 including shim and shim retention means effective when said set screw is loosened for insert replacement.

8. Holder of claim 7 wherein said shim retention means includes inter-engaging shim groove and pin projection surfaces.

9. Holder of claim 2 including lock pin retention means operative upon loosening said set screw for insert replacement to prevent pin disengagement from said holder.

10. Holder of claim 9 wherein said lock pin retention means includes pin groove and snap ring means.

11. Holder of claim 1 wherein inter-engaging fulcrum and lock pin projection means are provided with mating spherical radius surfaces.

12. Holder of claim 1 including round ISO curved aperture insert with positive rake side engaging matching holder shoulder surface means.

13. Holder of claim 12 including shim and shim retention means operative to prevent shim disengagement upon insert removal.

14. Holder of claim 13 including lock pin retention means operative to prevent pin disengagement upon insert removal.

15. Holder of claim 1 including direct insert seating means provided in the holder body.

16. Holder to claim 1 including lock pin formed with substantial lateral body projection beyond insert engagement surface.

17. Holder of claim 16 including actuating screw engagement of said projection.

18. Holder of claim 17 including actuating screw engagement of said projection at an intermediate level relative to said fulcrum means and insert shoulder.

19. Holder of claim 18 including lock pin terminating immediately below said fulcrum means.

20. Holder of claim 19 including blind hole in said holder terminating immediately below said lock pin.

* * * * *

UNITED STATES PATENT AND TRADEMARK OFFICE
CERTIFICATE OF CORRECTION

PATENT NO. : 4,632,593
DATED : December 30, 1986　　　　　　　Page 1 of 3
INVENTOR(S) : Daniel R. Stashko It is certified that error appears in the above—identified patent and that said Letters Patent is hereby corrected as shown below:

Add Figures 5-11 to the issued Patent as shown on the attached sheets.

Signed and Sealed this

Fifth Day of June, 1990

Attest:

HARRY F. MANBECK, JR.

*Attesting Officer*　　　　　*Commissioner of Patents and Trademarks*

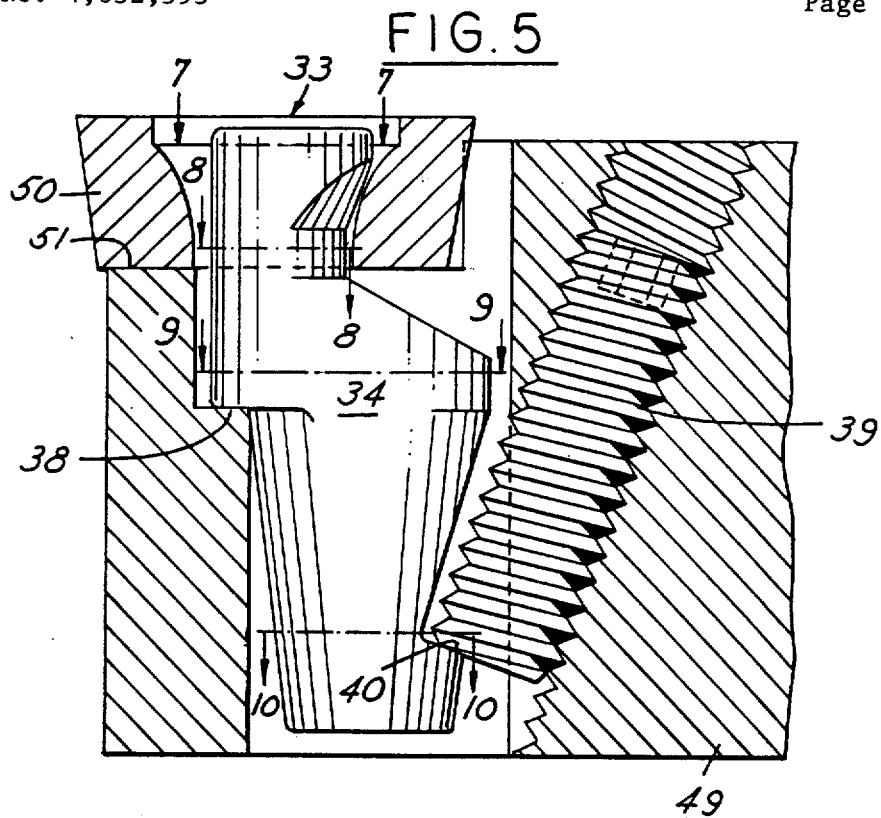
FIG. 5
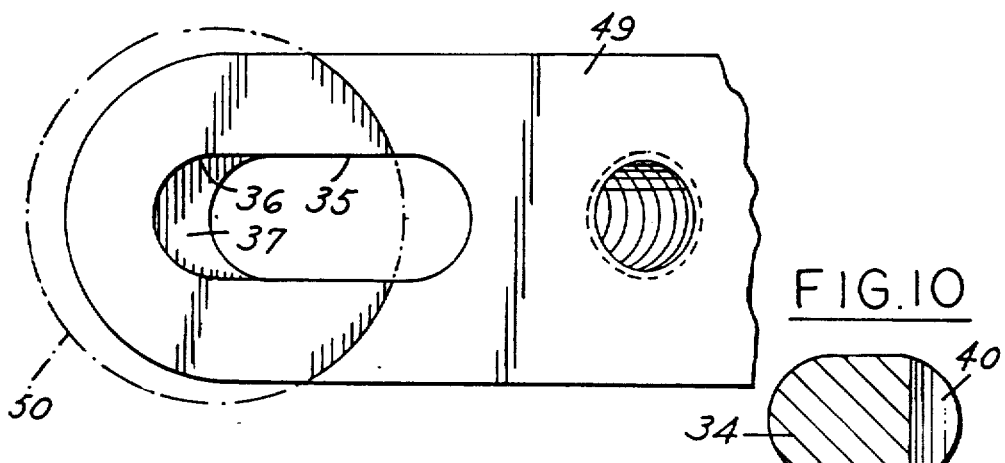
FIG. 6
FIG. 10
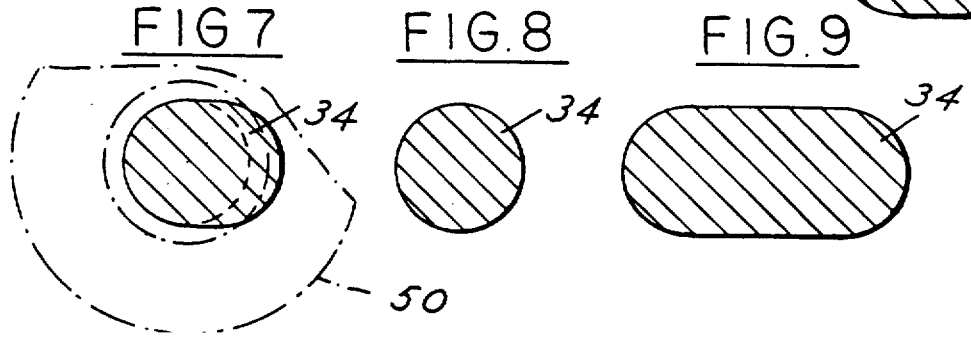
FIG. 7   FIG. 8   FIG. 9